Sept. 12, 1967 A. F. MacLEAN ETAL 3,341,297
PRODUCTION AND RECOVERY OF AQUEOUS HYDROGEN PEROXIDE SOLUTIONS
Original Filed Feb. 11, 1958
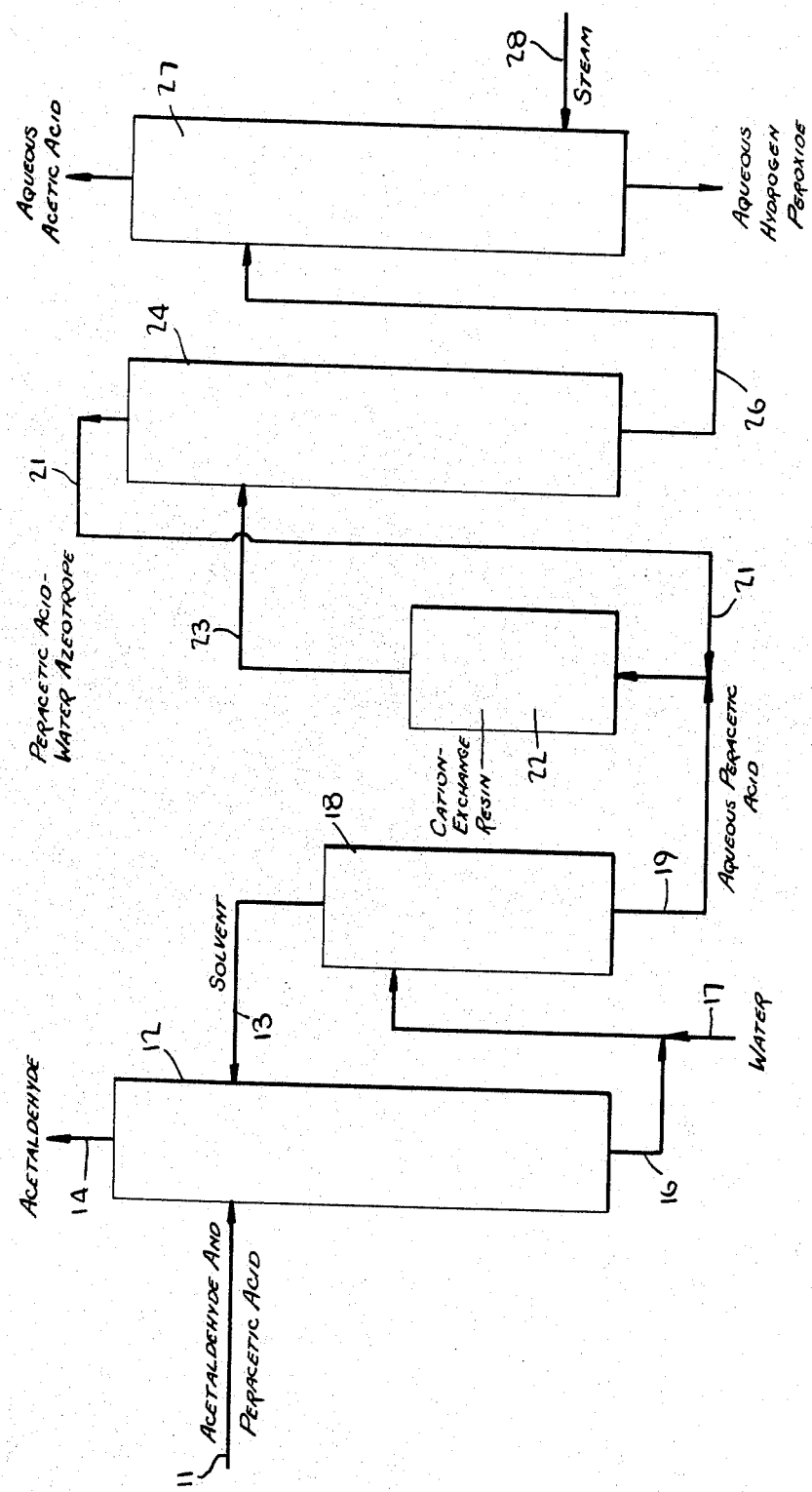

3,341,297
PRODUCTION AND RECOVERY OF AQUEOUS HYDROGEN PEROXIDE SOLUTIONS

Alexander F. MacLean and Adin L. Stautzenberger, Corpus Christi, Tex., assignors to Celanese Corporation, a corporation of Delaware
Continuation of application Ser. No. 714,627, Feb. 11, 1958. This application Feb. 26, 1964, Ser. No. 347,394
8 Claims. (Cl. 23—207)

This application is a continuation of U.S. application Ser. No. 714,627 filed Feb. 11, 1958, now abandoned.

This invention relates to the production of hydrogen peroxide.

It is an object of this invention to provide a new process for making hydrogen peroxide.

Other objects of this invention will be apparent from the following detailed description and claims. In this description and claims all proportions are by weight unless otherwise indicated.

In accordance with one aspect of this invention hydrogen peroxide is produced by bringing a mixture of water and peracetic acid into contact with a strong acid catalyst (of ionization constant above about 0.01), desirably an insoluble acid catalyst, to effect the reaction of the water and peracetic acid and form hydrogen peroxide and acetic acid, and then separating the catalyst from the reacted mixture. Preferably, the process is carried out by passing a stream of aqueous peracetic acid continuously through a bed of a cation-exchange resin, after which the reaction mixture is treated to separate the aqueous hydrogen peroxide from the acetic acid formed in the reaction and from unreacted peracetic acid.

The peracetic acid is conveniently obtained by the process described in our copending application Ser. No. 676,423 filed Aug. 5, 1957, now abandoned (a continuation-in-part of which issued as U.S. Patent No. 3,192,256 on June 29, 1965), the entire disclosure of which is hereby incorporated by reference. In that process, involving the vapor phase oxidation of acetaldehyde, there is obtained a stream of vapors containing peracetic acid and acetaldehyde. This stream of vapors may be fed to an intermediate portion of a distillation column, i.e. a fractionating column. A stream of solvent is fed to the lower portion of this column. The acetaldehyde is taken off overhead, and a solution of peracetic acid together with some acetic acid and substantially free of acetaldehyde, is taken off from the bottom of the column. In order to avoid reaction between the peracetic acid and acetaldehyde (which forms undesired acetic acid and reduces the amount of peracetic acid available) the solvent should be essentially non-aqueous. Preferably the solvent is one which boils between the boiling points of acetaldehyde and peracetic acid, and, most preferably, below 80° C. Acetone, methylal, tetrahydrofuran, methyl acetate and methanol are examples of preferred solvents.

In accordance with one aspect of this invention the non-aqueous solutions described above are converted to aqueous solutions by mixing them with water and distilling the solvent therefrom. More specifically, a solution of peracetic acid in a volatile water-soluble inert organic solvent, the concentration of peracetic acid being for example about 20 to 40%, may be mixed with water and fed continuously to the upper part of a second distillation column, and aqueous peracetic acid, of say about 20 to 50% concentration, may be withdrawn from the bottom of this second column, the volatile solvent substantially free of peracetic acid being taken off from the top.

The first and second distillation columns discussed above may be combined into a single column. In this case the stream of vapors of peracetic acid and acetaldehyde is fed at an intermediate point, refluxing solvent is maintained in the column, the water stream is fed near the bottom, acetaldehyde vapors are taken off from the top and a stream of aqueous peracetic acid is drawn off from the bottom, the temperatures in the column being such that one zone of the column, between the point of introduction of the peracetic acid and acetaldehyde and the point of introduction of the water, is rich in solvent and substantially free of water and acetaldehyde; the temperature at this zone may be, for example, in the range of about 40 to 80° C.

In another method of preparing the aqueous peracetic acid solution from the non-aqueous solution, the non-aqueous solution is mixed with an inert water-insoluble solvent, e.g. a hydrocarbon, such as n-hexane, n-heptane, or benzene, whose boiling point is above the boiling point of the original solvent and which boils below the boiling point of water or which forms, in the system, an azeotrope with water boiling below the boiling point of water. Vapors of the water-insoluble solvent may be fed to the lower portion of a distillation column while the solution of peracetic acid in the original solvent may be fed to an intermediate portion. The original solvent is distilled off from the top of this column and a solution of peracetic acid in the water-insoluble solvent emerges from the bottom of the column. Water is added to this solution and the resulting two-phase mixture, with most of the peracetic acid concentrated in the water phase, is separated; the water solution of peracetic acid is drawn off while the water-insoluble solvent is vaporized and returned to the lower portion of the same column. The presence of the water-insoluble solvent in the column serves to reduce the temperature required at the bottom of the column, as compared with the column bottom temperature when water, without the water-insoluble solvent, is added to the column. Thus, when n-hexane is added the temperature at the bottom of the column is about 68° C.; when using water without the water-insoluble solvent the bottom temperature is about 100° C. When the water and water-insoluble phases are well mixed at the point of vaporization, the water-insoluble solvent generally vaporizes as an azeotrope with water, having an even lower boiling temperature, thus further reducing the temperature at the base of the column. These temperatures are for operation at atmospheric pressure and it will be appreciated that lower temperatures can be obtained by operation at subatmospheric pressure, e.g. 7 p.s.i.a. The use of lower column temperatures decreases the tendency of the peracetate acid to decompose.

The use of water-soluble solvent may be eliminated by leading the mixture of vapors of paracetic acid and acetaldehyde directly to a distillation column supplied with the water-insoluble solvent, taking acetaldehyde overhead and taking off, below a solution of peracetic acid in the water-insoluble solvent, followed by extraction of the peracetic acid from this solution with water. However, when this is done the small amount of water, generally present in the vapor feed, results in the formation of a water phase rich in peracetic acid in the presence of acetaldehyde, which leads to undesirable reaction of peracetic acid and acetaldehyde, forming acetic acid and reducing the yield of peracetic acid.

As stated, an acidic cation-exchange resin may be employed as a catalyst for the reaction of the water and peracetic acid. This resin is advantageously a strongly acidic resin, e.g. a resin having free sulfonic acid groups, particularly a sulfonated cross-linked resin such as the resins of U.S. Patent No. 2,366,007, e.g. the sulfonated styrene-divinyl benzene copolymers. Other suitable cation-exchange resins are, for example, the phenol sulfonic acid-formaldehyde reaction products. It is desirable, of course, that the resin be substantially free of heavy metal ions and similar materials which catalyze decomposition of peroxides. It is also desirable to include in the reaction mixture a minor proportion of a stabilizer against such decomposition, e.g. a sequestering agent such as sodium pyrophosphate, dipicolinic acid or ethylene diamine tetracetic acid.

The aqueous peracetic acid brought into contact with the acid catalyst preferably contains about 20 to 40% peracetic acid. It also contains a minor proportion, relative to the peracetic acid, of acetic acid.

In one convenient process a stream of the aqueous peracetic acid is passed through a bed, desirably a fixed bed, of the acidic resin. The temperature of the bed may be, for example, in the range of about 10 to 90° C. The residence time of the reaction mixture in the bed is desirably such that about 50 to 80% of the peracetic acid is reacted. The reacted mixture leaving the bed of catalyst contains hydrogen peroxide, acetic acid, water and unreacted peracetic acid.

We have discovered that water and peracetic acid form an azeotrope, which can be distilled from hydrogen peroxide, water and acetic acid. At atmospheric pressure (760 mm.) this azeotrope boils at about 95.5° C. and contains about 60% (26 mole percent) peracetic acid. This discovery is utilized in the isolation of aqueous hydrogen peroxide from the other components of the mixture leaving the bed of catalyst. Thus, the mixture may be subject to two distillations: in one distillation an azeotrope of water and peracetic acid is taken off overhead for recycling to the bed of cation-exchange resin; while in the other distillation the acetic acid is stripped off by the injection of an inert gas, which may be nitrogen, for example, but is most preferably steam. The residue from the two distillations is an aqueous solution of hydrogen peroxide. The stripping of the acetic acid may be the first distillation in this sequence, but best results are obtained when the azeotrope distillation is carried out first. The two distillations are preferably effected in conventional distillation columns. Thus, in one embodiment, the stream of reacted mixture leaving the resin bed is fed to an intermediate portion of a fractionating column (hereinafter termed an "azeotrope column") and vapors of the peracetic acid-water azeotrope are taken off overhead. The stream of liquid mixture of water, hydrogen peroxide and acetic acid (containing for example, about 5–30% hydrogen peroxide, 5–30% water and the balance acetic acid) from the bottom of this azeotrope column is then introduced into the intermediate portion of a second fractionating column. A stream of steam (e.g. about 1.5 to 10 parts of superheated steam per part of the residue from the azeotrope column) is fed at a lower point on the second column, aqueous acetic acid is taken off overhead, and aqueous hydrogen peroxide (containing, for example, about 10–35% hydrogen peroxide) is removed continuously from the bottom of the second column.

To minimize decomposition in the distillation columns used for separating the components of the aqueous reacted mixture, these columns may be operated at subatmospheric pressure. For example, the azeotrope column may be operated at a pressure of 93 mm. of mercury absolute, at which the boiling point of the peracetic acid-water azeotrope is about 47.5° C.; about one half of the azeotrope formed under these conditions is peracetic acid.

Instead of employing a reduced pressure, a water-immiscible solvent which forms a three component solvent-peracetic acid-water azeotrope of lower boiling point than the peracetic acid-water azeotrope, may be added to the top of the azeotrope column. In this case vapors of the three component azeotrope are taken overhead, the vapors are condensed to form a two-phase mixture, most of the peracetic acid being in the aqueous phase, and the water-immiscible phase is returned to the top of the azeotrope column. The amount of water-immiscible solvent supplied to the top of the azeotrope column is preferably just sufficient to cause formation of the desired azeotrope. Preferably the solvent is so chosen that the amount of peracetic acid in the aqueous phase is at least equal to half the water therein. Thus, when n-heptane, which is the preferred solvent, is employed the ternary azeotrope, formed at an overhead temperature of 77–78° C. at 760 mm. Hg, contains about 9% peracetic acid, about 77% heptane and about 14% water, and the peracetic acid content of the heptane phase is about 0.2–0.3%. Other solvents are benzene, hexane, octane, ethylene chloride, propylene chloride.

The acetic acid stripping operation is carried out at such a temperature as to maintain the stripping agent in gaseous form and to volatilize the acetic acid therein. Thus when steam is the stripping agent the temperature should be at least 100° C. at atmospheric pressure.

The accompanying drawing is a flow sheet illustrating one embodiment of the invention.

In the drawing, vapors of a mixture of peracetic acid and acetaldehyde from a reactor, as described in our aforesaid copending application, are fed through a line 11 to an acetaldehyde separation column 12 to which a solvent is supplied through a line 13. Acetaldehyde vapors are taken off overhead, with refluxing, through a line 14, and a solution of peracetic acid in the solvent is discharged below through a line 16. Water is added, through a line 17, to this solution and the resulting aqueous mixture is fed to a solvent removal column 18, from which vapors of solvent are taken off overhead and then condensed, for return through line 13 to the acetaldehyde separation column 12. A solution of peracetic acid in water leaves the bottom of the solvent-removal column 18 through a line 19, is combined with recycled peracetic acid-water azeotrope from a line 21, and passes upward through a bed of granules of acidic resin contained in a reacter 22. The mixture then passes, through a line 23, to an azeotrope column 24, from which an azeotrope of water and peracetic acid is taken overhead, preferably with refluxing, through the line 21, this azeotrope being condensed and then recycled to the reactor 22. The residue of water, hydrogen peroxide and acetic acid, from the bottom of the azeotrope column 24, is fed through a line 26 to an acetic acid stripping column 27, to which steam is supplied through a line 38, and from which aqueous acetic acid is taken overhead (desirably with just sufficient refluxing to avoid loss of hydrogen peroxide overhead), through a line 29. The residue from the column 26 is the desired substantially pure aqueous hydrogen peroxide solution.

The following examples are given to illustrate this invention further.

EXAMPLE I

The apparatus described in the drawing is employed. A stream of vapors containing 79% acetaldehyde and 18% peracetic acid, produced in accordance with our aforesaid copending application, and at a temperature of 140° C. is fed at the rate of 28,600 parts per hour through the line 11, into a 35 tray column 12 at 15th tray from the top, and methylal is fed through the line 13, at the 13th tray from the top, at the rate of 11,400 parts per hour. The column 12 is operated at a base temperature of 77° C. and a top temperature of 20° C., a pressure of 1000 mm. Hg absolute, and a reflux ratio of 2:1. The water is supplied through line 17 at the rate of 5200 parts per hour.

The column 18 has 100 trays and is operated at a base temperature of 100° C. and a top temperature of 42° C., at atmospheric pressure and at a reflux ratio of 0.8:1. The combined feed of water and methylal solution of peracetic acid is fed in at the 10th tray from the top of column 18.

The reactor 22 is filled with granules of "Amberlite IR–120 (H) AG" and is operated at a temperature of 42° C., the space velocity of the liquid through the reactor being 0.051 per minute.

The azeotrope column 24 has 25 trays, and the reacted mixture enters this column at the 12th tray from the top;

the top temperature of this column is 78° C. and its bottom temperature is 100° C. The column is operated under a pressure of 450 mm. Hg absolute and a reflux ratio of 5:1.

The acetic acid stripping column 27 has 40 trays; the acetic acid-hydrogen peroxide-water mixture enters at the 3rd tray from the top; the steam at a temperature of 100° C. is introduced at the 39th tray from the top at the rate of 15,980 parts per hour; and the top and bottom temperatures in this column are 58° C. and 85° C. respectively. The pressure in this column is 100 mm. Hg absolute and the column is operated at 1:5 reflux ratio. The residue from column 27 contains 35% hydrogen peroxide and 0.22% acetic acid.

EXAMPLE II

Example I is repeated except that the line 21 is provided with a phase separator and a quantity of n-heptane is supplied to the top of the column 24 so that a ternary n-heptane-water-peracetic acid azeotrope is taken overhead, condensed and then separated into two phases, the heptane phase being returned to the top of the column 24, and all of the aqueous phase being fed through line 21 to the bed of resin 22 without reflux to the column 24. The top temperature of column 24 is 63° C., its bottom temperature is 100° C.

EXAMPLE III

Example I is repeated except that the solvent removal column 18 is fitted with a phase separator and flasher at the bottom thereof. In this case the solvent removal column has 32 trays and the residue from column 12 is fed, together with 30% of its weight of water, at the 13th tray from the top. Vapors of n-heptane (supplied from the flasher) are fed into the solvent removal column at the bottom tray. Methylal vapors are taken from the top of the solvent removal column. Residue from the base of the solvent removal column is mixed with the aqueous peracetic acid, derived from line 21, and fed to the phase separator, at the base of said column; the resulting separated aqueous phase containing the peracetic acid is fed continuously to the bed of cation-exchange resin, while the less dense water-immiscible phase comprising the heptane is fed to the flasher where it is vaporized by heating. The temperature at the top of the solvent removal column is 42° C., at the bottom of this column it is 85° C., in the phase separator it is 80° C. and in the flasher, which is under a pressure of 900 mm. Hg absolute, it is 106° C. During the continuous operation only sufficient heptane is added to replace losses.

EXAMPLE IV 100 parts of a solution of 17% peracetic acid in methylal containing 2% acetic acid is mixed with 25 parts of water and 0.01 part of sodium pyrophosphate as a stabilizer against decomposition of peroxy compounds, and the mixture is fed continuously to the fifteenth tray from the top of a 25-tray distillation column having at the base thereof a reboiler heated by a jacket of boiling n-butyl acetate. Methylal containing less than 0.01% peracetic acid is taken overhead at a temperature of 42° C. at a 1:1 reflux ratio, while an aqueous 37% solution of peracetic acid, containing less than 0.05% methylal, is withdrawn from the base of the column at a temperature of 95° C. The residence time of the peracetic acid in the column is 9 minutes. The entire process is carried out at atmospheric pressure.

EXAMPLE V n-Hexane is refluxed in a glass helix-packed distillation column 1 inch in diameter and 18 inches high, fitted with a heated thermosiphon reboiler at its base, 100 parts of an 18% solution of peracetic acid in methylal containing 1.8% acetic acid is diluted with 120 parts of water and the mixture is fed continuously to the middle of the column, while reflux is continued. The mixture of n-hexane, water, peracetic acid and acetic acid continuously withdrawn from the base is continuously separated in the reboiler into two phases, the n-hexane phase being vaporized and returned to the base of the column, which is at a temperature of about 68° C., while the aqueous phase is withdrawn. This example is carried out at atmospheric pressure.

EXAMPLE VI

Methylal and n-hexane are refluxed in a 45-tray distillation column, fitted with a heated reboiler in its base, the amounts of methylal and hexane being such that during operation of the material at the base of the column is hexane free of methylal, while at the middle of the column (e.g. at the 22nd tray from top) the liquid phase is methylal free of hexane. Vapors of a feed mixture of 79 parts acetaldehyde and 18 parts peracetic acid are then passed continuously into the column at the 15th tray from the top at the rate of 28,600 parts of feed mixture per hour. Acetaldehyde is taken overhead continuously at a temperature of 21° C. using a reflux ratio of 1:1, while from the base of the column a mixture of n-hexane and peracetic acid at a temperature of about 68° C. is withdrawn continuously and, in the reboiler, is blended with a stream of 5720 parts per hour of water having a temperature of about 60° C. and separated into two phases. The aqueous peracetic acid phase is withdrawn continuously from the reboiler and the hexane phase is vaporized in the reboiler and returned as vapors to the base of the column. This example is effected at atmospheric pressure.

EXAMPLE VII

A stream of 200 parts per hour, of an aqueous 11.6% solution of peracetic acid in water containing no acetic acid is blended with 130 parts per hour of an aqueous recycle, described below, and the blend (containing 11.3% peracetic acid) is passed downward through a bed of Amberlite IR120 H AG acidic cation-exchange resin at a temperature of 42° C., the space velocity of the liquid through the bed being 0.51 per minute. The product, containing 2.2% peracetic acid, 3.5% hydrogen peroxide and 6.2% acetic acid, is fed continuously to a 10-tray distillation column in which n-heptane is being refluxed. From the top of the column a heptane-water-peracetic acid azeotrope is taken off at a temperature of 79° C. This azeotrope is condensed and separates into two phases, the heptane phase being recycled to the top of the column and the aqueous phase being used as the recycle, described above. From the base of the column, at a temperature of about 90° C., an aqueous solution of 6.3% hydrogen peroxide, 0.13% peracetic acid, and 11.3% acetic acid is removed continuously.

The entire process is effected under atmospheric pressure.

EXAMPLE VIII

A stream of dry, superheated steam at a temperature of 103° C. is fed below the bottom tray of a 20-tray insulated distillation column at the rate of 170 parts per hour. A stream of aqueous solution of 10% hydrogen peroxide and 35% acetic acid is heated to a temperature of 100° C. (just below its bubble point) and added continuously to the third tray from the top of the column at the rate of 100 parts per hour. The column is maintained throughout at a temperature sufficient to prevent condensation of steam therein, i.e. at about 100° C. The aqueous vapor stream taken from the top of the column at a reflux ratio of 1:5 contains 18% acetic acid and only 0.3% hydrogen peroxide, while the liquid aqueous stream removed from the bottom of the column contains 12% hydrogen peroxide and 1% acetic acid. When the ratio of the steam to the feed (i.e. the aqueous solution of hydrogen peroxide and acetic acid fed to the column) is increased (e.g. to 3:1) the proportion of acetic acid in the base product decreases. When the same process is carried out using a column having more trays above the point at which the feed is introduced (e.g. 5 trays above the feed point), the proportion of hydrogen peroxide taken overhead is decreased. The process is effected at atmosphere pressure.

It is to be understood that the foregoing detailed description is merely given by way of illustration and that many variations may be made therein without departing from the spirit of our invention.

The embodiments of the invention in which an exclusive property or privilege is claimed are defined as follows:

1. Process for the separation of peracetic acid from a mixture comprising peracetic acid, water and hydrogen peroxide, which comprises feeding said mixture to an intermediate point in a distillation column operating at subatmospheric pressure of about 93 mm. Hg abs. and recovering in the distillate from said column an azeotrope of water and peracetic acid of which about one-half is peracetic acid, the mixture being distilled consisting of compounds containing only carbon, hydrogen and oxygen while permitting substantially no peracetic acid to be removed from said column as other than said distillate.

2. Process for the separation of peracetic acid from a mixture comprising peracetic acid, water and hydrogen peroxide which comprises introducing said mixture into a fractionating column, supplying a water-immiscible volatile hydrocarbon to the top of said column, taking off overhead the vapors of a three-component hydrocarbon-peracetic acid-water azeotrope, condensing said vapors to form a two-phase liquid mixture, including a water-immiscible phase and returning said water-immiscible phase to the top of said column.

3. The process as set forth in claim 2 in which said hydrocarbon is heptane.

4. Process for the separation of hydrogen peroxide from a mixture containing hydrogen peroxide, water, peracetic acid and acetic acid which comprises the steps of:
(A) distilling a mixture comprising peracetic acid, water and hydrogen peroxide and taking off vapors of an azeotrope comprising peracetic acid and water to leave a fraction rich in hydrogen peroxide; and
(B) stripping a mixture comprising acetic acid, water and hydrogen peroxide with an inert gas to take off overhead a mixture of acetic acid and water and to leave a fraction rich in hydrogen peroxide; and using the hydrogen peroxide-rich fraction of one of said steps as the feed mixture for the other of said steps.

5. The process as set forth in claim 4 in which said inert gas is steam.

6. Process for the production of aqueous hydrogen peroxide which comprises bringing a feed mixture of peracetic acid and sufficient water to convert at least 50% of said peracetic acid, by reaction with water, to hydrogen peroxide into contact with a solid acid cation-exchange resin catalyst to effect the reaction of water and peracetic acid whereby at least 50% of said peracetic acid is converted to hydrogen peroxide and acetic acid; separating said catalyst from the reaction mixture; partially recovering said reaction mixture by subatmospheric azeotropic distillation to produce a peracetic acid-water azeotropic distillate, and recovering aqueous hydrogen peroxide from the thus-distilled reaction mixture.

7. The process as set forth in claim 6, wherein said peracetic acid-water reaction is carried out at about 10 to 90° C. and wherein said azeotrope is recycled to said catalyst.

8. Process for the production of aqueous hydrogen peroxide which comprises feeding peracetic acid and sufficient water to convert at least 50% of said peracetic acid, by reaction with water, to hydrogen peroxide to a bed of insoluble acid cation-exchange resin catalyst to form a mixture of hydrogen peroxide, acetic acid, water and unreacted peracetic acid, separating said catalyst from said reaction mixture, distilling said separated reaction mixture to produce overhead an azeotrope comprising peracetic acid and water and a residue comprising acetic acid, water and hydrogen peroxide and then stripping said residue with steam to produce overhead an aqueous solution of acetic acid and a residue of aqueous hydrogen peroxide.

References Cited

UNITED STATES PATENTS

| | | | |
|---|---|---|---|
| 2,165,293 | 7/1939 | Nadeau et al. | 203—70 |
| 2,186,617 | 1/1940 | Othmer | 202—42 |
| 2,314,385 | 3/1943 | Bludworth | 260—502 |
| 2,461,988 | 2/1949 | Kooijman | 23—207 X |
| 2,690,993 | 10/1954 | McGrath | 203—95 |
| 2,802,025 | 8/1957 | Weitbreeht et al. | 23—207 X |
| 2,804,473 | 8/1957 | Phillips et al. | 260—502 |
| 2,814,641 | 11/1957 | Phillips et al. | 202—42 |
| 2,910,504 | 10/1959 | Hawkinson et al. | 260—502 |

FOREIGN PATENTS

| | | |
|---|---|---|
| 1,116,826 | 2/1956 | France. |

OTHER REFERENCES

Bunton et al. Chemistry and Industry, pages 191–192, Feb. 13, 1954.

OSCAR R. VERTIZ, *Primary Examiner.*

MAURICE A. BRINDISI, *Examiner.*

O. F. CRUTCHFIELD, *Assistant Examiner.*